US007864235B2

(12) United States Patent
Abe

(10) Patent No.: US 7,864,235 B2
(45) Date of Patent: Jan. 4, 2011

(54) IMAGING DEVICE AND IMAGING METHOD INCLUDING GENERATION OF PRIMARY COLOR SIGNALS

(75) Inventor: Nobuaki Abe, Saitama (JP)

(73) Assignee: Hoya Corporation, Tokyo (JP)

( * ) Notice: Subject to any disclaimer, the term of this patent is extended or adjusted under 35 U.S.C. 154(b) by 1249 days.

(21) Appl. No.: 11/391,248

(22) Filed: Mar. 29, 2006

(65) Prior Publication Data

US 2006/0222324 A1 Oct. 5, 2006

(30) Foreign Application Priority Data

Mar. 30, 2005 (JP) .................. P2005-097429

(51) Int. Cl.
*H04N 5/335* (2006.01)
(52) U.S. Cl. .................................. 348/279
(58) Field of Classification Search ................ 348/262, 348/272, 277, 294, 279; 386/68, 76
See application file for complete search history.

(56) References Cited

U.S. PATENT DOCUMENTS

| 4,434,435 | A | * | 2/1984 | Fujimoto | 348/277 |
|---|---|---|---|---|---|
| 5,063,439 | A | * | 11/1991 | Tabei | 348/272 |
| 5,187,569 | A | * | 2/1993 | Tani | 348/277 |
| 5,745,171 | A | * | 4/1998 | Ogawa et al. | 348/234 |
| 7,317,478 | B2 | * | 1/2008 | Aotsuka | 348/223.1 |
| 7,373,020 | B2 | * | 5/2008 | Tsukioka | 382/300 |
| 7,463,287 | B2 | * | 12/2008 | Aotsuka | 348/223.1 |
| 7,489,346 | B2 | * | 2/2009 | Mizukura et al. | 348/223.1 |
| 7,499,083 | B2 | * | 3/2009 | Honda | 348/224.1 |
| 7,589,858 | B2 | * | 9/2009 | Atsumi et al. | 358/1.16 |
| 7,633,537 | B2 | * | 12/2009 | Hoshuyama | 348/272 |
| 2004/0095489 | A1 | * | 5/2004 | Hirose | 348/262 |
| 2004/0100570 | A1 | * | 5/2004 | Shizukuishi | 348/272 |
| 2005/0206759 | A1 | * | 9/2005 | Fukunaga et al. | 348/294 |
| 2006/0012808 | A1 | * | 1/2006 | Mizukura et al. | 358/1.9 |

FOREIGN PATENT DOCUMENTS

| EP | 1 575 304 | 9/2005 |
|---|---|---|
| JP | 2872759 | 1/1999 |
| JP | 2002-271804 | 9/2002 |
| JP | 2003-284084 | 10/2003 |
| JP | 2004-200357 | 7/2004 |
| JP | 2004-208079 | 7/2004 |
| JP | 2004-228662 | 8/2004 |

* cited by examiner

*Primary Examiner*—Nhan T Tran
*Assistant Examiner*—Kent Wang
(74) *Attorney, Agent, or Firm*—Greenblum & Bernstein P.L.C.

(57) ABSTRACT

An imaging device has an image sensor, and a color filter that is located on said image sensor and has at least four color elements, a signal reading processor that reads at least four series of color signals corresponding to the at least four color elements from said image sensor, and a signal processor that generates primary color signals on the basis of at least one predetermined series of color signals and an adopted series of color signals that is obtained from the remaining series of color signals. The signal processor defines a series of color signals that corresponds to a spectral response distribution curve over wavelength range for which spectral values in the spectral distribution of the object are relatively large, as the adopted series of color signals.

13 Claims, 11 Drawing Sheets

IMAGING DEVICE AND IMAGING METHOD INCLUDING GENERATION OF PRIMARY COLOR SIGNALS

BACKGROUND OF THE INVENTION

1. Field of the Invention

The present invention relates to an imaging device incorporated in electronic equipment, such as a digital still/movie camera, a cellular-phone, and so on. Especially, it relates to a signal process associated with a color reproduction.

2. Description of the Related Art

In an imaging device, a primary color filter such as R, G, and B color filter or a complementary color filter such as Ye, CY, Mg, and G color filter is arranged on a photo-sensitive area of an image sensor. The color filter has R, G, and B color elements arrangement in a checkered configuration such that the color elements are opposite to pixels arranged in the photo-sensitive area. Light, reflected on an object, passes through the color filter so that image-pixel signals composed of color signals corresponding to the color elements, are generated and read from the image sensor. The image-pixel signals are subjected to a color conversion process or a matrix computation to produce image signals depending upon the standard color space defined by the colorimetry. Consequently, video signals such as NTSC signals are output to peripheral apparatus such as a monitor.

In a digital camera, various arrangements of the color elements, or color conversion processes has been attempted to adequately reproduce an objective color as accurately as possible, namely, to reproduce the objectives color so as to be colors that are perceived or visualized in real lire. For example, a color element "G'", which has a relative spectral response property (characteristics) close to that of the Green color element (G), is arranged in the color filter instead of Green color element "G", so that corrected or modified red color signals for the color Red, which makes a colorimetrical range of reproduced color broad, are generated. Another color filter is composed of four color elements, "R", "G", and "B" color elements and a color element that has a different spectral transmission property. In this case, R, G, and B primary color signals, corresponding to tristimulus values, are generated by a "4×3" matrix computation. The four color elements reproduce an objective color while reducing noise.

SUMMARY OF THE INVENTION

An object of the present invention is to provide an imaging device that is capable of adequately reproducing any color of the object. An imaging device according to the present invention has an image sensor, and a color filter that is located on said image sensor and has at least four color elements, and a signal reading processor that reads at least four series of color signals corresponding to the at least four color elements from said image sensor.

The four color elements in the color filter are based on primary colors, and respectively have different spectral transmission distribution properties. The spectral transmission distribution properties characterize spectral response distribution properties of the imaging device, which correspond to three spectral response distribution curves that are based on a color space defined in the colorimetry, such as sRGB color space, XYZ color apace, L*a*b* color space, L*u*v* color space, and so on.

In the imaging device according to the present invention, a signal processor generates primary color signals on the basis of at least one predetermined series of color signals and a series of color signals (an adopted series of color signals) that is obtained from the remaining series of color signals. In the at least one predetermined series of color signals, information associated with a spectral distribution of an object is included.

The at least one predetermined series of color signals corresponds to a related spectral response distribution curve over the entire spectrum, namely, over the entire spectral distribution. On the other hand, the remaining series of color signals corresponds to a related spectral response distribution curve over a part of the entire spectrum, the range of which is different for each series.

Then, the signal processor defines a series of color signals that corresponds to or suites with a related spectral response distribution curve over a wavelength range for which spectral values in the spectral distribution of the object are relatively large, as the adopted series of color signals.

BRIEF DESCRIPTION OF THE DRAWINGS

The present invention will be better understood from the description of the preferred embodiments of the invention act forth below together with the accompanying drawings, in which.

DESCRIPTION OF THE PREFERRED EMBODIMENTS

Hereinafter, the preferred embodiments of the present invention are described with reference to the attached drawings.

Figure 1:
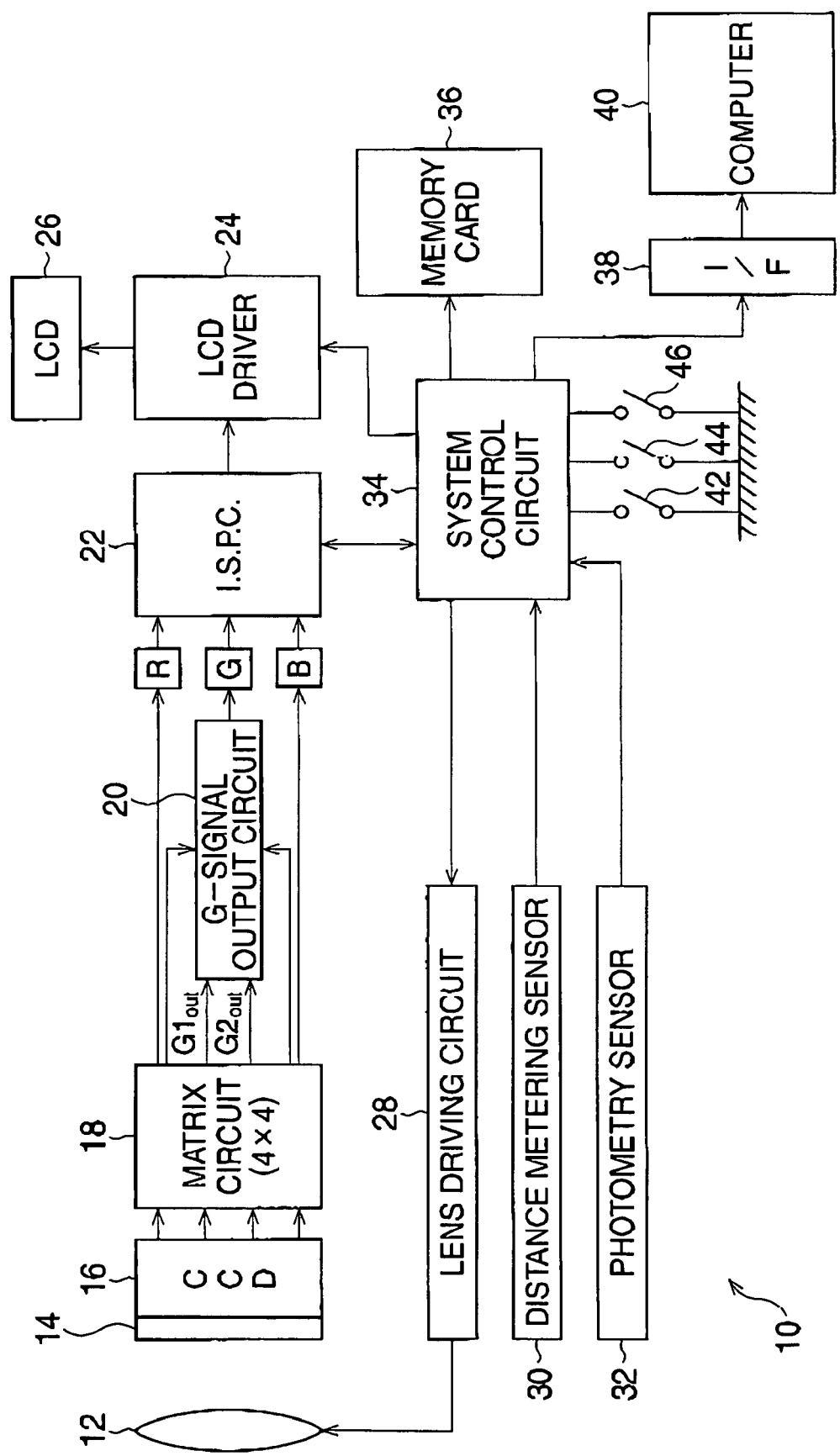
FIG. 1 is a block diagram of a digital camera according to a first embodiment.

FIG. 1 is a block diagram of a digital camera according to a first embodiment.

A digital camera 10 has a photographing optical system 12 and a CCD 16. Light, reflected on an object, passes through the photographing optical system 12 and an infrared light cut-off filter (not shown), and reaches the photo-sensitive area of the CCD 16, so that an object image is formed on the photo-sensitive area. Herein, a color imaging method using an on-chip color filter is applied as an imaging process. A color filter, checkered by four color elements "R0", "X", "Z", and "B0", is arranged on the photo-sensitive area such that the four color elements are opposite to pixels arranged in the photo-sensitive area. The color elements "R0" and "B0"

respectively correspond to the color Red (R) and the color Blue (B). The color elements "X" and "Z" correspond to the color Green (G).

In the CCD 16, four series of color signals, which are tour series of image-pixel signals corresponding to the color elements "R0", "X", "Z", and "B0", are generated. The four series of color signals are then read from the CCD 16 in accordance with clock pulse signals fed from a CCD driver (not shown). The four series of color signals are amplified in an initial processing circuit (not shown) and subjected to given processes. The processed image-pixel color signals are then fed to a matrix circuit 18.

In the matrix circuit 18, the four series of color signals corresponding to the four color elements "R0", "X", "Z", and "B0" are subjected to a color conversion process. Four series of color signals obtained by the color conversion process includes two series of color signals corresponding to Red (R) and Blue (B), namely, the R and B signals of the R, G, and B primary color signals. Two remaining series of color signals correspond to Green (G). In a G-signal output circuit 20, a series of color signals that suits to or corresponds to a G signals of the R, G, and B primary color signals, is determined on the basis of the two series of color signals corresponding to the R and B color signals, Thus, R, G, and B primary color signals corresponding to tristimulus values are generated and are fed to an image signal processing circuit 22. Herein, a "sRGB" color space, which is the default standard color space for a digital camera, is applied to correctly reproduce colors on the basis of a standard monitor, and a standard visual surrounding environment.

In the image signal processing circuit 22, the R, G, and B primary color signals are subjected to various processes such as a white balance process, gamma correction, and so on, so that video signals, depending upon the standard sRGB color space, are generated. The video signals are fed to an LCD driver 24, which drives an LCD 26 on the basis of the video signals. Thus, an object image is displayed on the LCD 26 as a movie image.

When the release button (not shown) is depressed halfway and a half-depression switch 42 is turned ON, a distance from the camera 10 to the object is measured by a distance metering sensor 30, and a brightness of the object is measured by a photometry sensor 32. In a system control circuit 34, exposure values, namely, shutter speed and F number are calculated on the basis of the measured brightness of the object. Also, the photographing optical system 12 is driven by a lens driving circuit 28 so as to focus an object, in accordance with the measured distance. When release button is depressed fully and a full-depression switch 44 is turned ON, a shutter and an iris (not shown) are driven so as to generate one frame worth of image-pixel signals. The image-pixel signals are read from the CCD 16 and are processed at the matrix circuit 18, the G-signal output circuit 20, and the image signal processing circuit 22. Then, image signals are compressed as image data and the compressed image data is recorded in a memory card 36. When a transmission button is operated and a transmission switch 46 is turned ON, the recorded image data is output to the peripheral equipment such as a computer via an I/F circuit 38.

Figure 2:
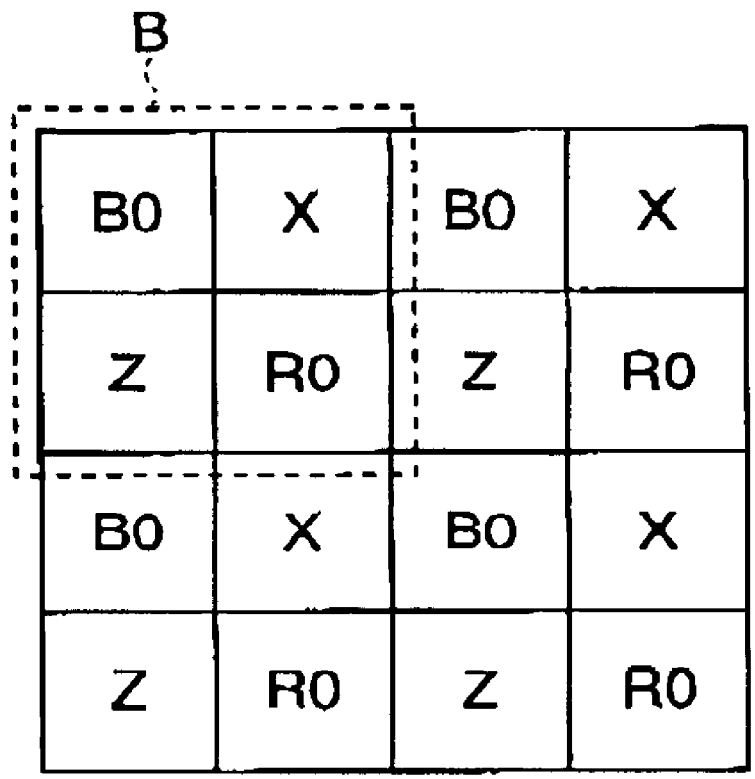
FIG. 2 is a view showing a part of a color filter.
Figure 2:
Figure 3:
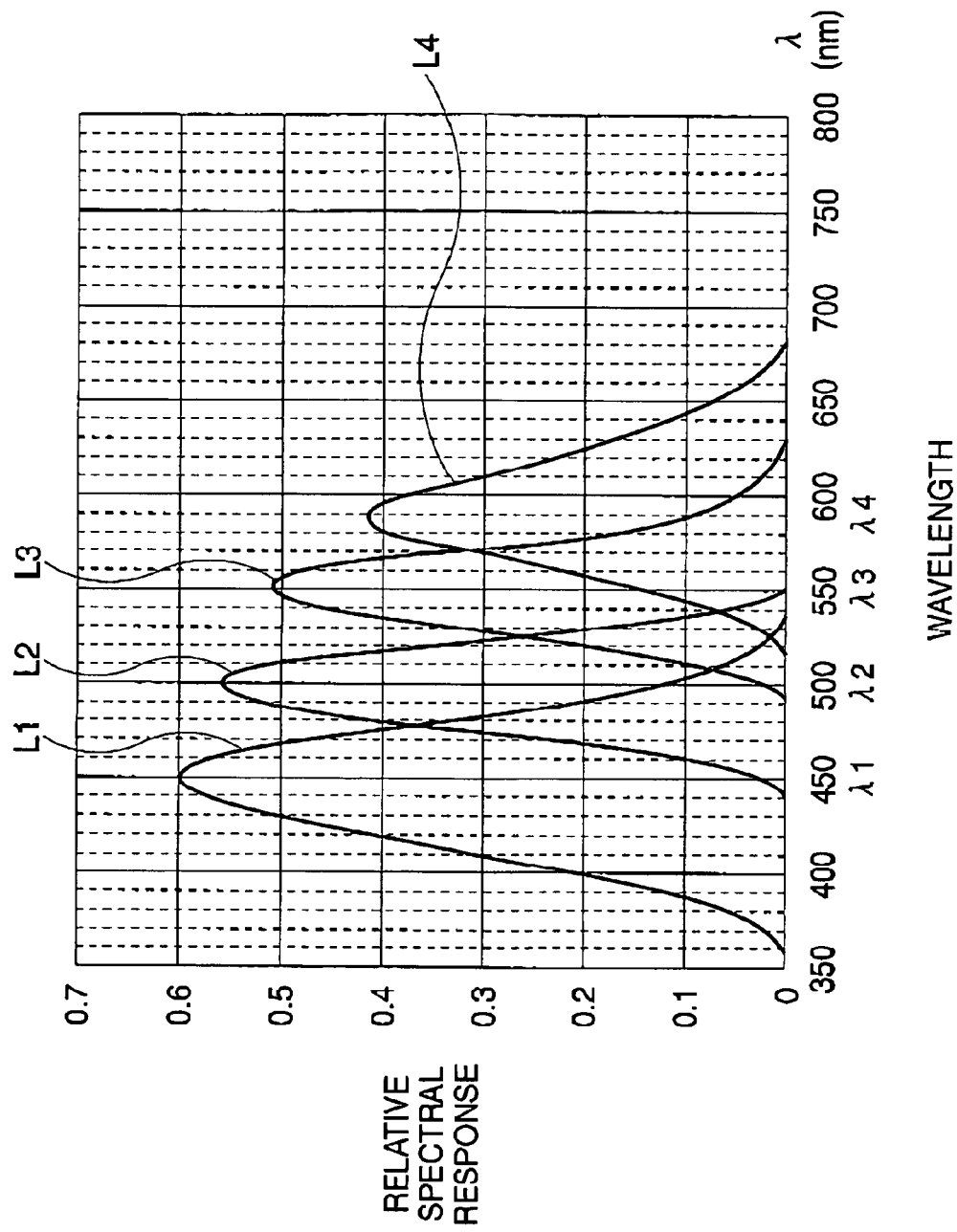
FIG. 3 is a view showing a relative spectral response property of an input system.

FIG. 2 is a view showing a part of the color filter 14. FIG. 3 is a view showing a relative spectral response (sensitivity) property of an input system, namely, an imaging device according to the digital camera 10. With reference to FIGS. 2 and 3, the four color elements in the color filter 14 are explained.

As shown in FIG. 2, the color filter 14 is a Bayer array type filter, and the color filter 14 is formed by regularly arranging a plurality of blocks "B", each block being composed of the four color elements "R0", "X", "Z", and "B0". The color element "B0" transmits light having a relatively short wavelength corresponding to the color Blue, and the color elements "R0" transmits light having a relatively long wavelength corresponding to the color Red. On the other hand, the color element "X" transmits light with a wavelength between Blue and Green, and the color element "Z" transmits light having a wavelength between Green and Red. The four color elements "B0", "X", "Z", and "R0" are arranged in a checkered array such that each element is opposite to a corresponding pixel in the photo-sensitive area of the CCD 16.

The spectral response or sensitivity distribution of the input system shown in FIG. 3 is a combination of a spectral transmission distribution property of the color filter 14, a spectral response distribution property of the photographing optical system 12 and/or the infrared beam cut-off filter, and a spectral response distribution property of the CCD 16. The spectral response distribution property of the input system, is substantially characterized by the spectral transmission distribution property of the color filter 14, namely, the four color elements "B0", "X", "Z", "R0", and is generally represented by four Gauss distributions. Each spectral distribution curves is herein designated by "L1", "L2", "L3", and "L4", which respectively correspond to the color elements "B0", "X", "Z", and "R0". The spectral response distribution curves "L1", "L2", "L3", and "L4" respectively have peak wavelengths "$\lambda 1$" (=450 nm), "$\lambda 2$" (=500 nm), "$\lambda 3$" (=550 nm), and "$\lambda 4$" (=590 nm).

The spectral distribution curve "L1" mainly corresponds to the Blue light component, and the range of the spectral distribution is between 360 nm and 540 nm. The spectral distribution curve "L4" mainly corresponds to the Red light component, and the range of spectral distribution is between 520 nm and 680 nm. The spectral distributions "L2" and "L3" are between the spectral distribution "L1" and the spectral distribution "L4" such that the intervals between the neighboring spectral distributions are equal to each other, The curves of the spectral distributions "L1", "L2", "L3", and "L4" are defined such that the peak wavelength "$\lambda 1$", "$\lambda 2$", "$\lambda 3$", and "$\lambda 4$" exists at an intervals equal to each other.

Figure 4:
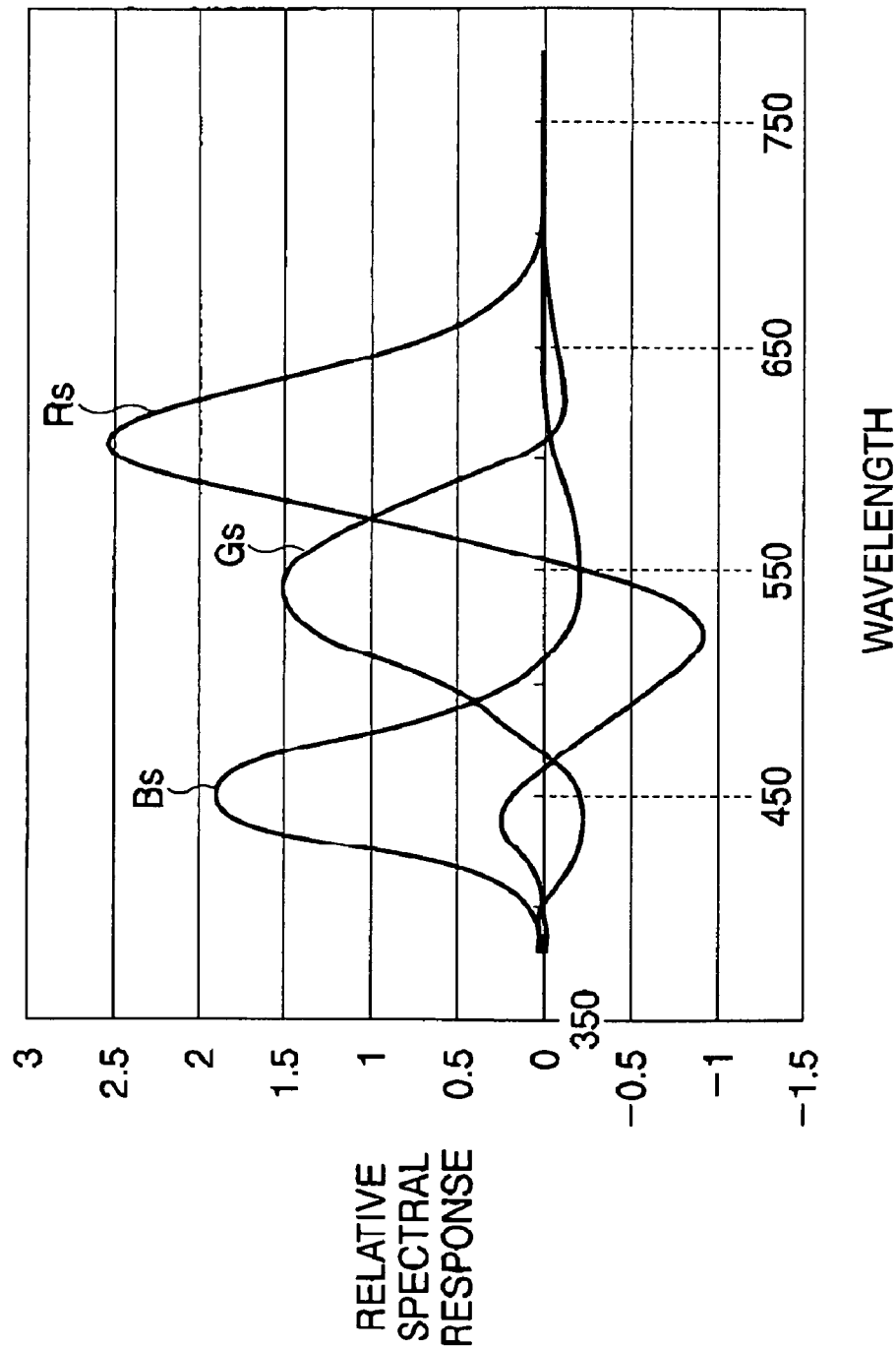
FIG. 4 is a view showing a standard spectral response distribution property of an imaging device.
Figure 5:
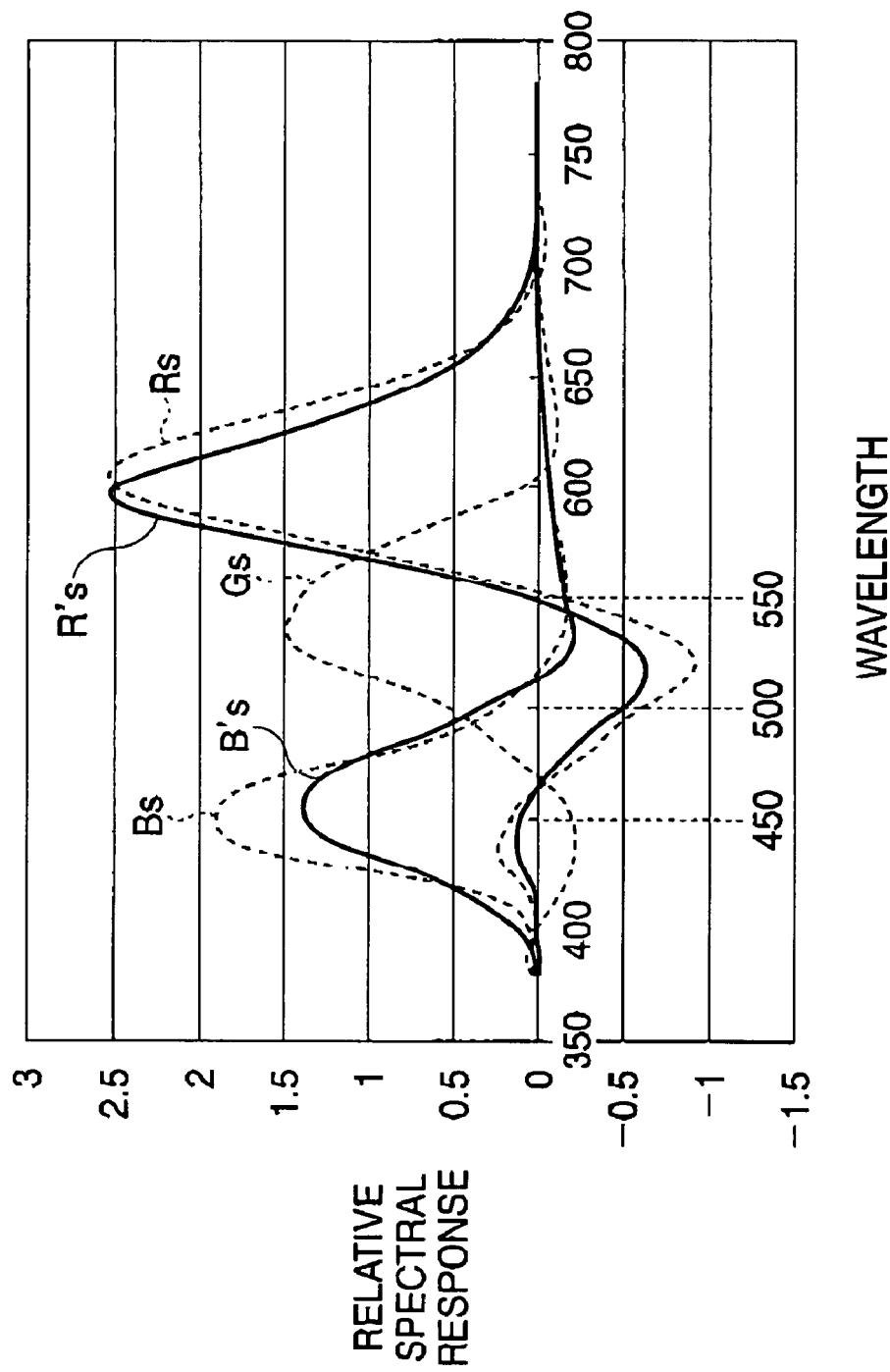
FIG. 5 is a view showing spectral response distributions corresponding to the color elements "B0" and "R0"
Figure 6:
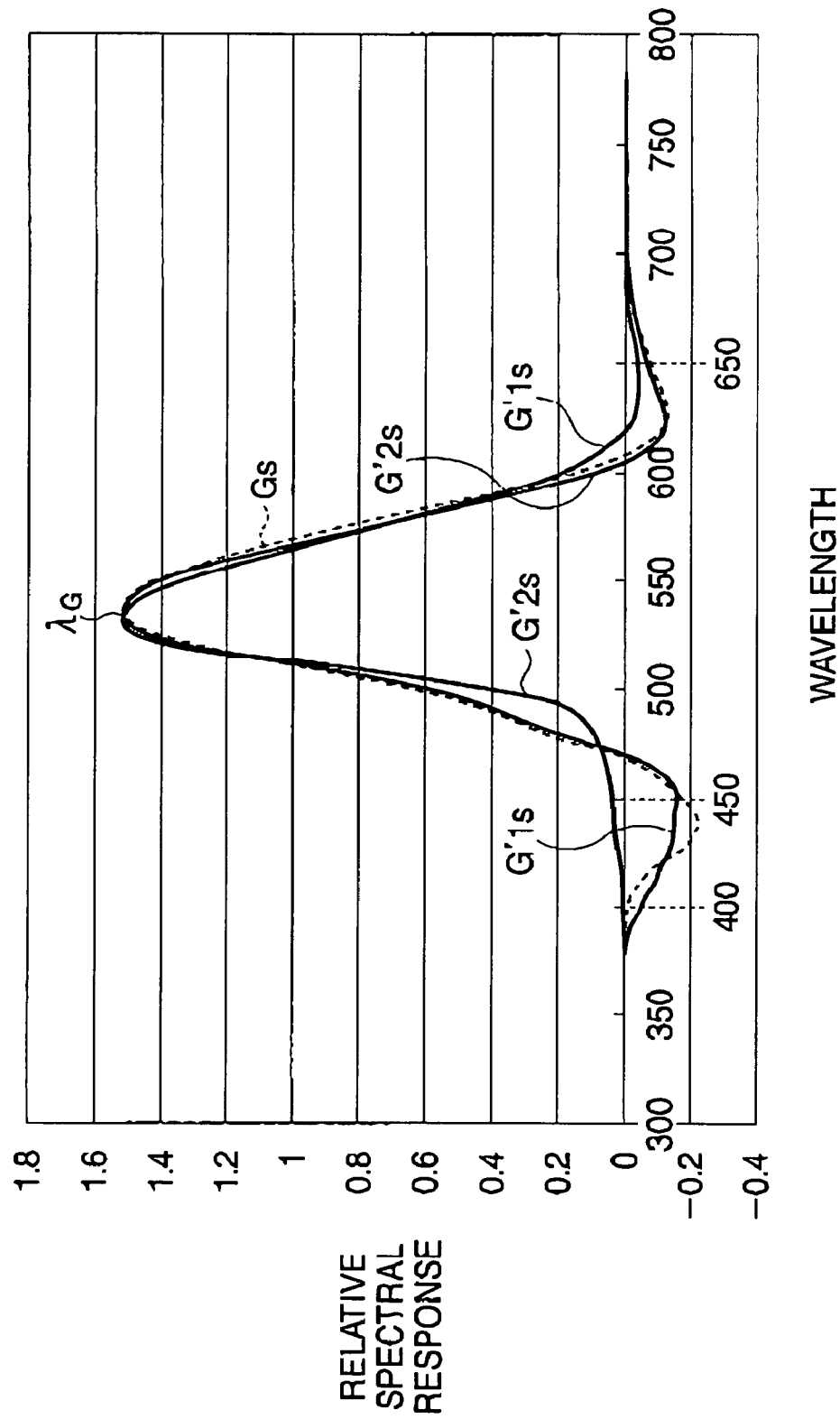
FIG. 6 is a view showing spectral response distributions corresponding to the color elements "X" and "Z"

FIG. 4 is a view showing standard spectral response distribution properties of an imaging device. FIG. 5 is a view showing spectral response distributions corresponding to the color elements "B0" and "R0". FIG. 6 is a view showing spectral response distributions corresponding to the color elements "X" and "Z".

The spectral response or sensitivity distribution properties shown in FIG. 4 are ideal distribution properties that adequately reproduce objective colors, and correspond to the color matching functions that are deemed to represent the human visual sensitivity or perception in the colorimetry. Herein, three curves corresponding to the color matching functions are designated by "Rs", "Gs", and "Bs". The spectral response distribution properties shown in FIG. 4 generate colorimetric values independent of the spectral response characteristics of the imaging device according to the digital camera 10, namely, they generates a so called "Device-Independent Color". Note that, the spectral response distribution shown in FIG. 4 is based on the sRGB color space as a standard color space.

To obtain the Device Independent Color, the four series of color signals "$R_{in}$", "$Z_{in}$", "$X_{in}$", and "$B_{in}$", which are obtained based on the spectral response distribution properties shown in FIG. 3 and respectively correspond to the color elements "R0", "Z", "X", and "B0", are subjected to a matrix computation or operation in the matrix circuit 18 based on the following equation.

$$\begin{bmatrix} R_{out} \\ G1_{out} \\ G2_{out} \\ B_{out} \end{bmatrix} = \begin{bmatrix} 10.8 & 0.6 & -1.8 & 0.1 \\ -0.8 & 2.55 & 0.6 & -0.34 \\ -1.6 & 3 & -0.1 & 0.05 \\ -0.2 & -0.19 & -0.65 & 2.35 \end{bmatrix} \begin{bmatrix} R_{in} \\ Z_{in} \\ X_{in} \\ B_{in} \end{bmatrix} \quad (1)$$

As can be seen from the Equation (1), a matrix coefficient in the first row and the third column is set to a relatively small value, whereas a matrix coefficient in the third row and the second column is set to a relatively large value. Each matrix coefficient is set to a given value so as to meet the so called "rooter condition (requirement)" that correctly reproduces an objective color, as closely as possible.

Using the above matrix operation, the four color signals "$R_{in}$", "$Z_{in}$", "$X_{in}$", and "$B_{in}$" are subjected to the color conversion process to generate four color signals "$R_{out}$", "$G1_{out}$", "$G2_{out}$", and "$B_{out}$". The color signals "$R_{out}$" and "$B_{out}$" corresponds to the two values "X" and "Y" of the tristimulus values "X, Y, Z", and are directly output to the image signal processing circuit 22 as "R" and "B" primary color signals. On the other hand, the color signals "$G1_{out}$" and "$G2_{out}$" corresponds to the value "Y" of the tristimulus values "X, Y, Z". Then, "C" primary color signals are generated on the basis of the two color signals "$G1_{out}$" and "$G2_{out}$". Hereinafter, the color signals "$G1_{out}$" and "$G2_{out}$" are respectively called a "first color signal" and a "second color signal".

The spectral response distributions "R's" and "B's" shown in FIG. 5 are based on the spectral response distributions "L1" and "L4" shown in FIG. 3, and are obtained by the matrix operations described above. The spectral response distributions "R's" and "B's" correspond to the ideal spectral response distribution "Rs" and "Bs" shown in FIG. 4, and the curves of the spectral response distributions "R's" and "B's" are generally the same as those of the spectral response distributions "Rs" and "Bs". On the other hand, the spectral response distributions "G'1s" and "G'2s" shown in FIG. 6 are based on the spectral response distributions "L2" and "L3" shown in FIG. 3, and are also obtained by the matrix operation. The spectral response distributions "G'1s" and "G'2s" correspond to the ideal spectral response distribution "Gs" shown in FIG. 4.

The curve of the spectral response distribution "G'1s" b and the curve of the spectral response distribution "G'2s" are different to each other. In the wavelength range less than the peak wavelength "$\lambda_G$" of the spectral response distribution "Gs", the curve line of the spectral distribution "G'1s" generally coincides with that of the ideal spectral response distribution "Gs". Especially, the curve line coincides with that of the ideal spectral response distribution "Gs" over a negative lobe of the spectral response distribution "Gs". On the other hand, in the wavelength range greater than the peak wavelength "$\lambda_G$", the curve line of the spectral distribution "G'2s" generally coincides with that of the spectral distribution "Gs".

In the present embodiment, a series of color signals that corresponds to the spectral response distribution "Gs" based on the sRGB color space, is determined on the basis of the spectral distribution properties of light reflected from the object, namely, the spectral reflectance factor of the object. Since information regarding the spectral distribution properties is included in the color signals "$R_{out}$" and "$B_{out}$", the adopted series of color signals are defined on the basis of the color signals "$R_{out}$" and "$B_{out}$" obtained by the matrix operation.

Figure 7:
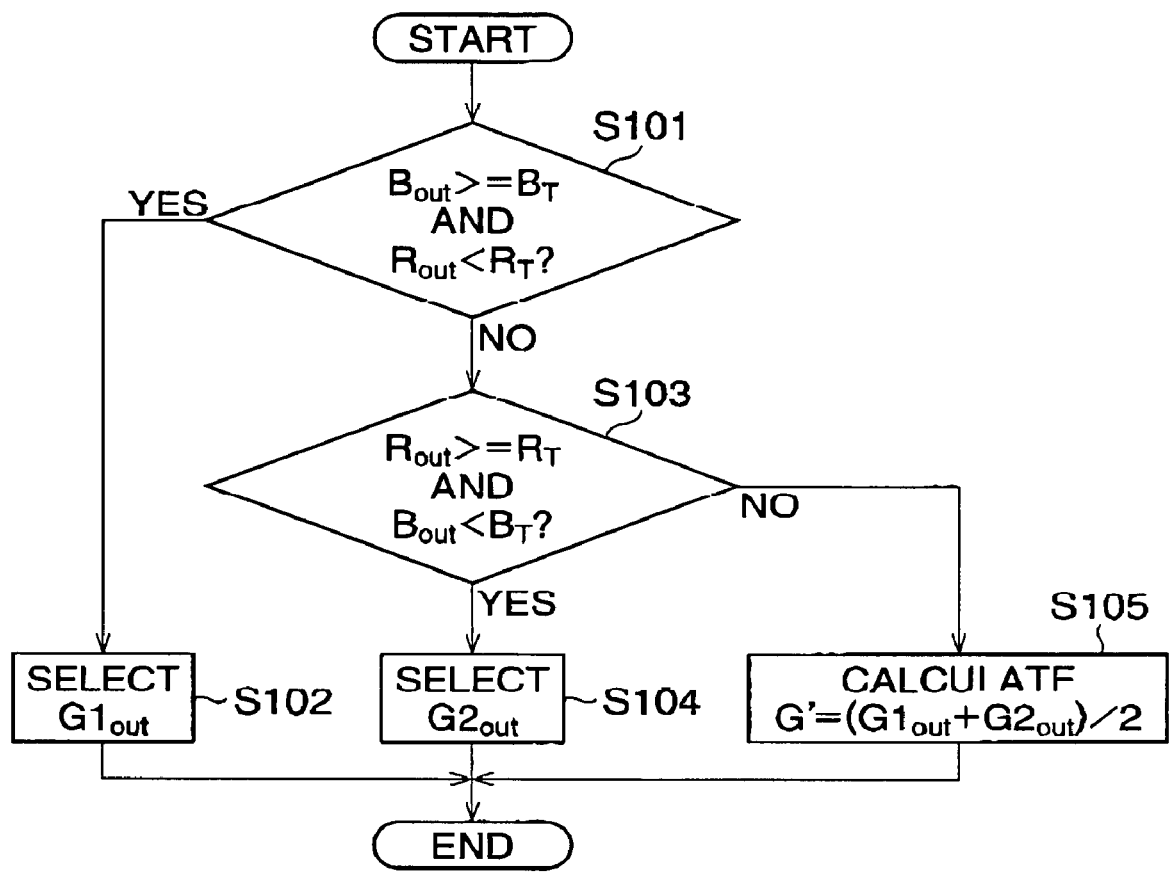
FIG. 7 is a flowchart of a process for defining the primary color signals corresponding to the color Green (G)
Figure 8:
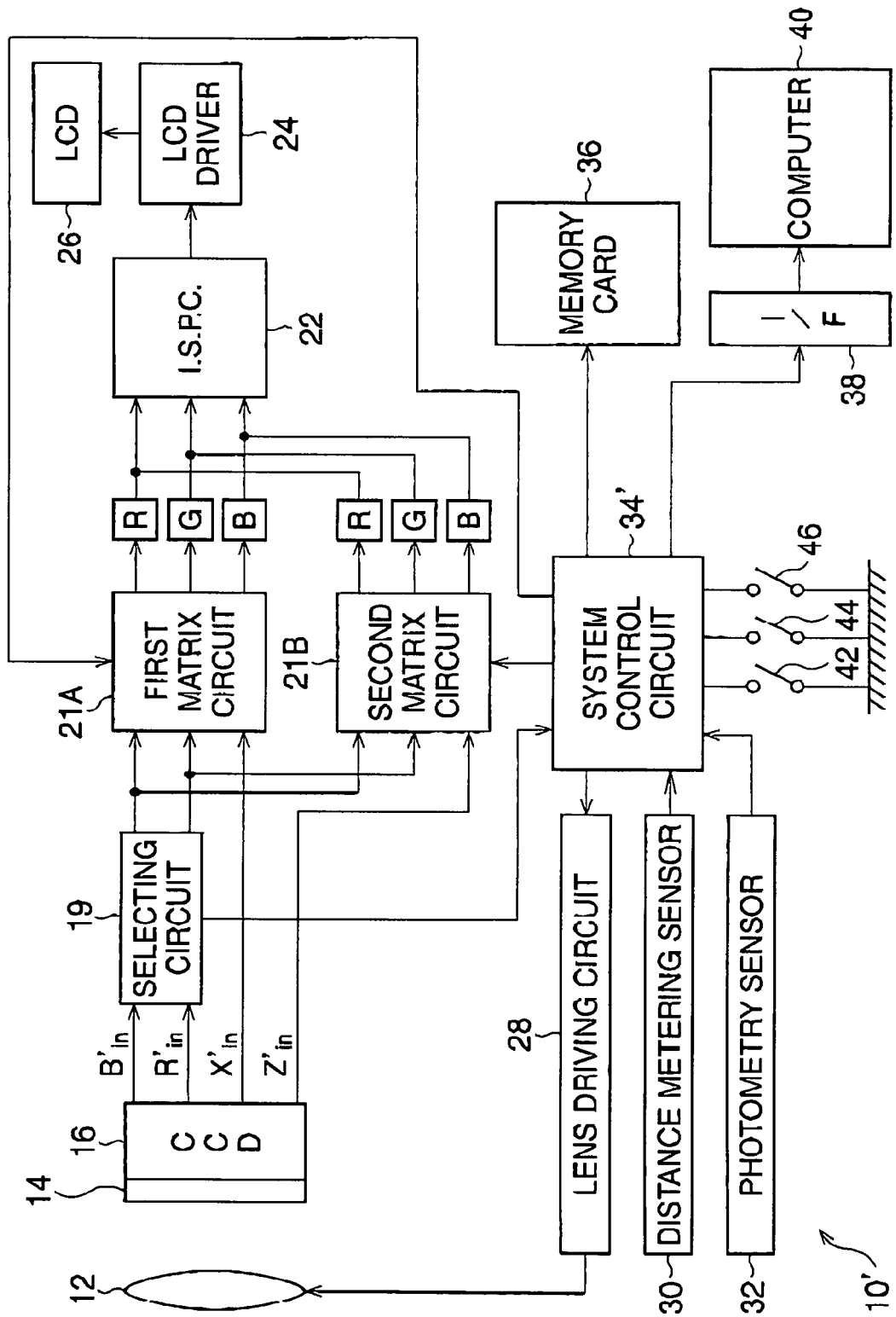
FIG. 8 is a block diagram of a digital camera according to a second embodiment.

FIG. 7 is a flowchart of the process for defining the primary color signal corresponding to the color Green (G).

In Step S101, it is determined whether the value of the color signal "$B_{out}$" is equal to or more than a boundary value "$B_T$" and the color signal "$R_{out}$" is smaller than a boundary value "$R_T$". For example, when the object is bluish, namely, a spectral reflectance factor of the object has characteristics such that the spectral values in a short-wavelength range are relatively large, the color signal "$B_{out}$" is relatively larger than the color signal "$R_{out}$". In turn, when the object is reddish, namely, a spectral reflectance factor of the object has characteristics such that the spectral values in a long-wavelength range are relatively large, the color signal "$R_{out}$" is relatively larger than the color signal "$B_{out}$". Herein, the object is classified into three types with respect to an objective color, namely, an object wherein spectral values in the short-wavelength range are relatively large, an object wherein spectral values in the long-wavelength range are relatively large, and an object having another type of spectral distribution. The boundary values "$R_T$" and "$B_T$" are predetermined to classify the object, and are set in accordance with the spectral response distributions "Rs" and "Bs".

When it is determined that the value of the color signal "$B_{out}$" is equal to or more than a boundary value "$B_T$" and the color signal "$R_{out}$" is smaller than a boundary value "$R_T$", the process goes to Step S102, wherein the first color signal "$G1_{out}$" corresponding to the spectral response distribution "G'1s" is selected as the primary color signal "G". As shown in FIG. 6, since the spectral response distribution "G'1s" coincides with the ideal spectral response distribution "Gs" in a range less than the peak wavelength "$\lambda_G$", "R", "G", and "B" primary color signals that correctly reproduce the objective color are output.

On the other hand, when it is determined that the value of the color signal "$B_{out}$" is not equal to or more than a boundary value "$B_T$", or the color signal "$R_{out}$" is not smaller than a boundary value "$R_T$", the process goes to Step S103. In Step S103, it is determined whether the value of the color signal "$B_{out}$" is smaller than the boundary value "$B_T$" and the value of the color signal "$R_{out}$" is equal to or more than the boundary value "$R_T$".

When it is determined that the value of the color signal "$B_{out}$" is smaller than the boundary value "$B_T$" and the value of the color signal "$R_{out}$" is equal to or more than the boundary value "$R_T$", the process goes to Step S104, wherein the second color signal "$G2_{out}$" corresponding to the spectral response distribution "G'2s" is selected as the color signal "G". As shown in FIG. 6, the spectral response distribution "G'2s" coincides with the ideal spectral response distribution "Gs" in a range more than the peak wavelength "$\lambda_c$". Consequently, the "R", "G", and "B" primary signals are output.

On the other hand, when, in Step S103, it is determined that the value of the color signal "$B_{out}$" is not smaller than the boundary value "$B_T$" and the value of the color signal "$R_{out}$" is not equal to or more than the boundary value "$R_T$", the process goes to Step S105, wherein the color signal "G" is calculated as the color signal "G" by dividing a mum of the values of color signals "$G1_{out}$" and "$G2_{out}$" by 2.

In this way, in the present embodiment, the color filter 14, which is composed of the two color elements "R0" and "B0" corresponding to the color Red and color Blue, and the two color elements "X" and "Z" corresponding to the color Green, is provided on the CCD 16. Then, the color signals "$R_{in}$", "$X_{in}$", "$Z_{in}$", and "$B_{in}$" read from the CCD 16 are subjected to the matrix operation in the matrix circuit 18 so that the color signals "$R_{out}$", "$G1_{out}$", "$G2_{out}$", and "$B_{out}$" are generated. In the G-signal output circuit 20, the spectral distribution of light reflected from the object, namely, the spectral reflectance factor is detected on the basis of the color signals "$R_{out}$" and "$B_{out}$". Then, based on the first and second color signals "$G1_{out}$" and $G2_{out}$", the color signals that corresponds to the spectral distribution property of the object, namely, the related spectral response distribution curve defined in the color space, are selected or calculated.

Another spectral transmission distribution property of the color elements may be applied. Also, a complementary color filter may be applied, and color signals corresponding to the color Blue may be set on the basis of the color signals corresponding to the color Green and the color Red, or color signals corresponding to the color Red may be set on the basis of the color signals corresponding to the color Green and the color Blue. The color filter may be constructed of at least four color elements.

With reference to FIGS. 8 to 11, the second embodiment is explained. The second embodiment is different from the first embodiment in that one color signal corresponding to the color Green (G) is firstly selected from two color signals, and after that a matrix operation is performed. Note that, since the other construction is substantially the same as that of the first embodiment, the same reference numerals are used for the same constructions.

FIG. 6 is block diagram of a digital camera according to the second embodiment.

The digital camera 10' has a selecting circuit 19, a first matrix circuit 21A, and a second matrix circuit 21B. A system control circuit 34' controls the first and second matrix circuits 21A and 21B. Image-pixel signals corresponding to four color elements "R0", "X", "Z", and "B0" are read from a CCD 16, and two color signals corresponding to the color elements "R0" and "B0" are fed to the selecting circuit 19. In the selecting circuit 19, as described later, one signal is selected from the color signals corresponding to the color elements "X" and "z", on the basis of the color signals corresponding to the color elements "R0" and "B0". Hereinafter, the color signals that correspond to the color elements "R0" and "B0" and are input to the selecting circuit 19, are respectively designated by "$R'_{in}$" and "$B'_{in}$".

In the first matrix circuit 21A, the color signals corresponding to the color elements "R0", "X", and "B0" are subjected to the matrix operation so that R, G, and B primary color signals are venerated. On the other hand, in the second first matrix circuit 21B, the color signals corresponding to the color elements "R0", "Z", and "B0" are subjected to the matrix operation to generate the R, G, and B primary color signals.

Figure 9:
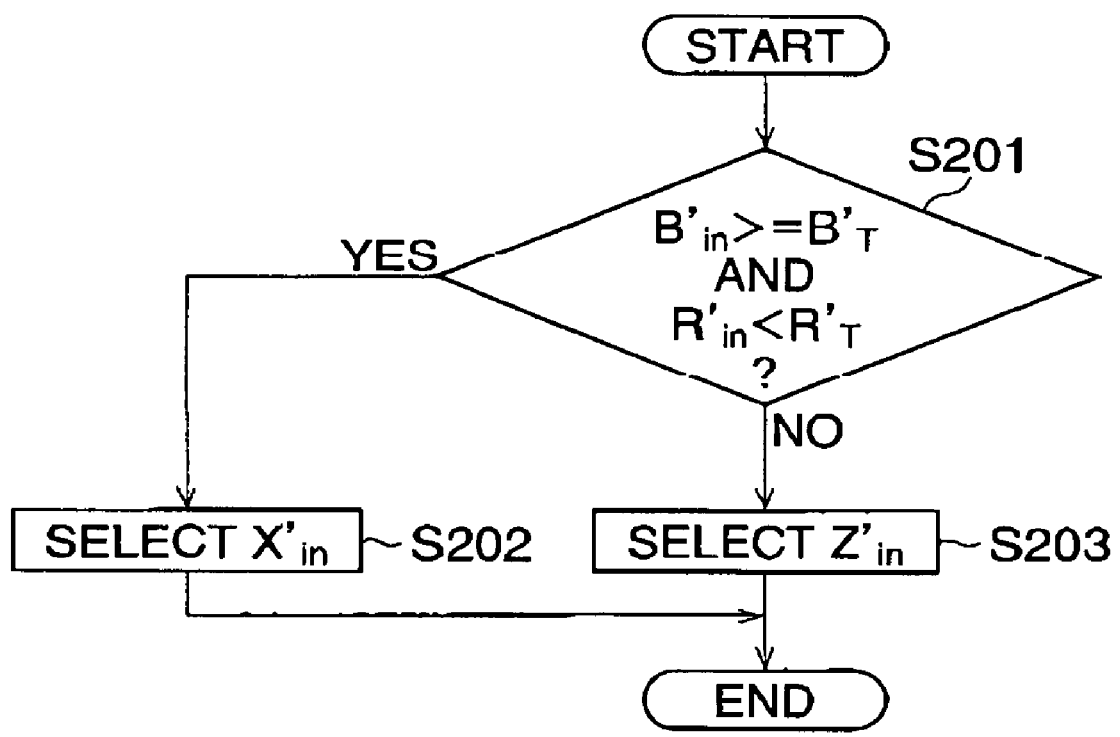
FIG. 9 is a flowchart of a process for selecting color signals corresponding to the color Green (G)

FIG. 9 is a flowchart of a process for selecting a color signal corresponding to the color Green (G).

In Stop S201, it is determined whether the value of the color signal "$B'_{in}$" is equal to or more than the boundary value "$B'_T$" and the color signal "$R'_{in}$" is smaller than the boundary value "$R'_T$". When it is determined that the value of the color signal "$B'_{in}$" is equal to or more than the boundary value "$B'_T$" and the color signal "$R'_{in}$" is smaller than the boundary value "$R'_T$", the process goes to Step S202, wherein the color signal corresponding to the color element "X" is selected. Then, in the first matrix circuit 21A, the color signals "$R_{out}$", "$G_{out}$", and "$B_{out}$" are generated as the R, G, and B primary colors signals in accordance with the following equation. Note that, color signals that are input to the first matrix circuit 21A are designated by "$R_{in}$", "$X_{in}$", and "$B_{in}$".

$$\begin{bmatrix} R_{out} \\ G_{out} \\ B_{out} \end{bmatrix} = \begin{bmatrix} -4 & -1.2 & 0.4 \\ -3 & 1.1 & -0.3 \\ 2 & -0.9 & 2.7 \end{bmatrix} \begin{bmatrix} R'_{in} \\ X'_{in} \\ B'_{in} \end{bmatrix} \quad (2)$$

On the other and, when it is determined that the value of the color signal "$B'_{in}$" is not equal to or more than the boundary value "$B'_T$" and the color signal "$R'_{in}$" is not smaller than the boundary value "$R'_T$", the process goes to Step S203, wherein the color signal corresponding to the color element "Z" is selected. Then, in the second matrix circuit 21B, the color sign as "$R_{out}$", "$G_{out}$", and "$B_{out}$" are generated as the R, G, and B color signals in accordance with the following equation.

$$\begin{bmatrix} R_{out} \\ G_{out} \\ B_{out} \end{bmatrix} = \begin{bmatrix} 12.5 & -1.85 & -0.5 \\ -1.6 & 2.85 & 0.6 \\ 0.1 & -0.5 & 2.35 \end{bmatrix} \begin{bmatrix} R'_{in} \\ Z'_{in} \\ B'_{in} \end{bmatrix} \quad (3)$$

Figure 10:
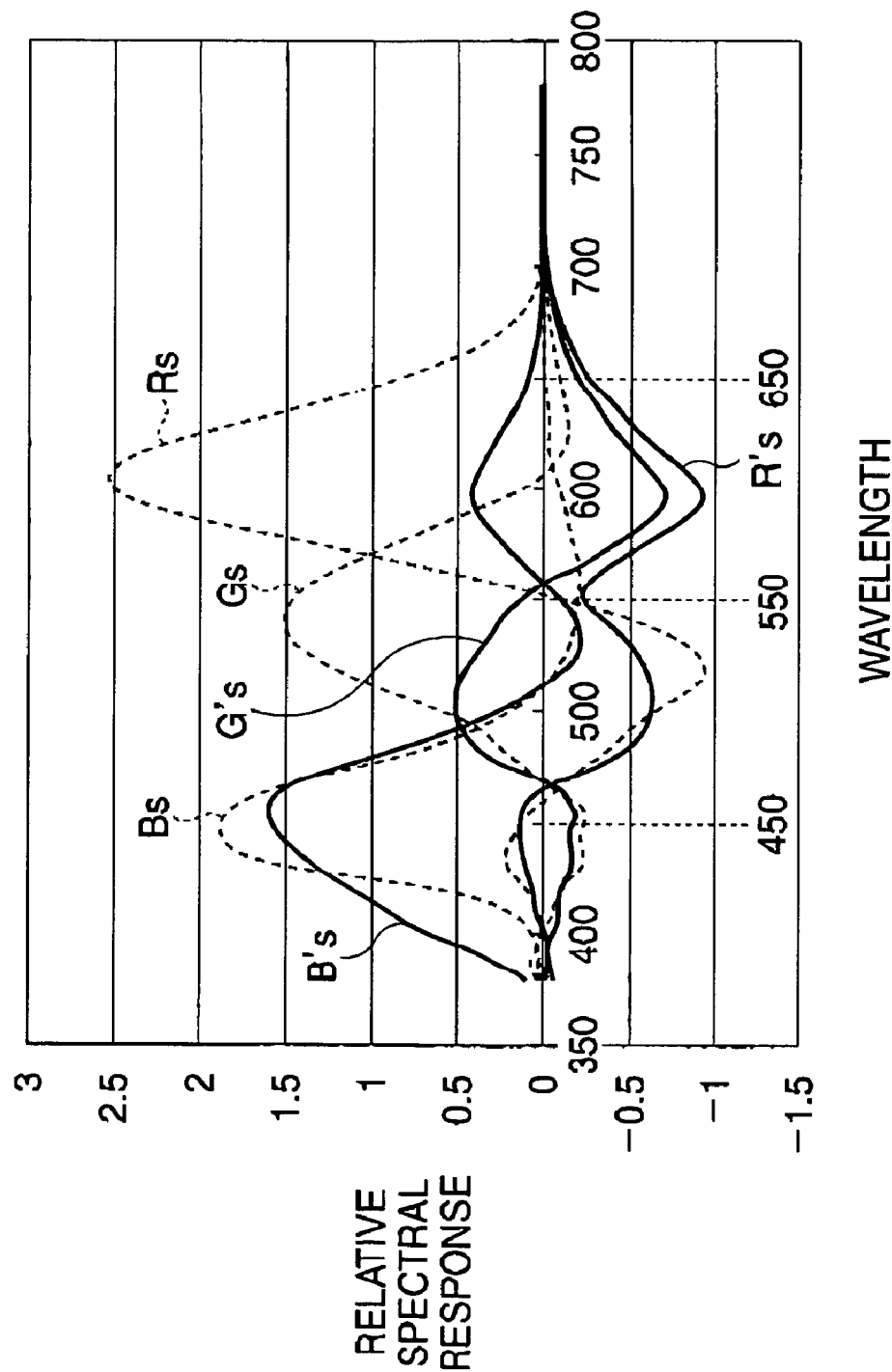
FIG. 10 is a view showing the spectral response distribution of the primary color signals obtained by a first matrix circuit.
Figure 11:
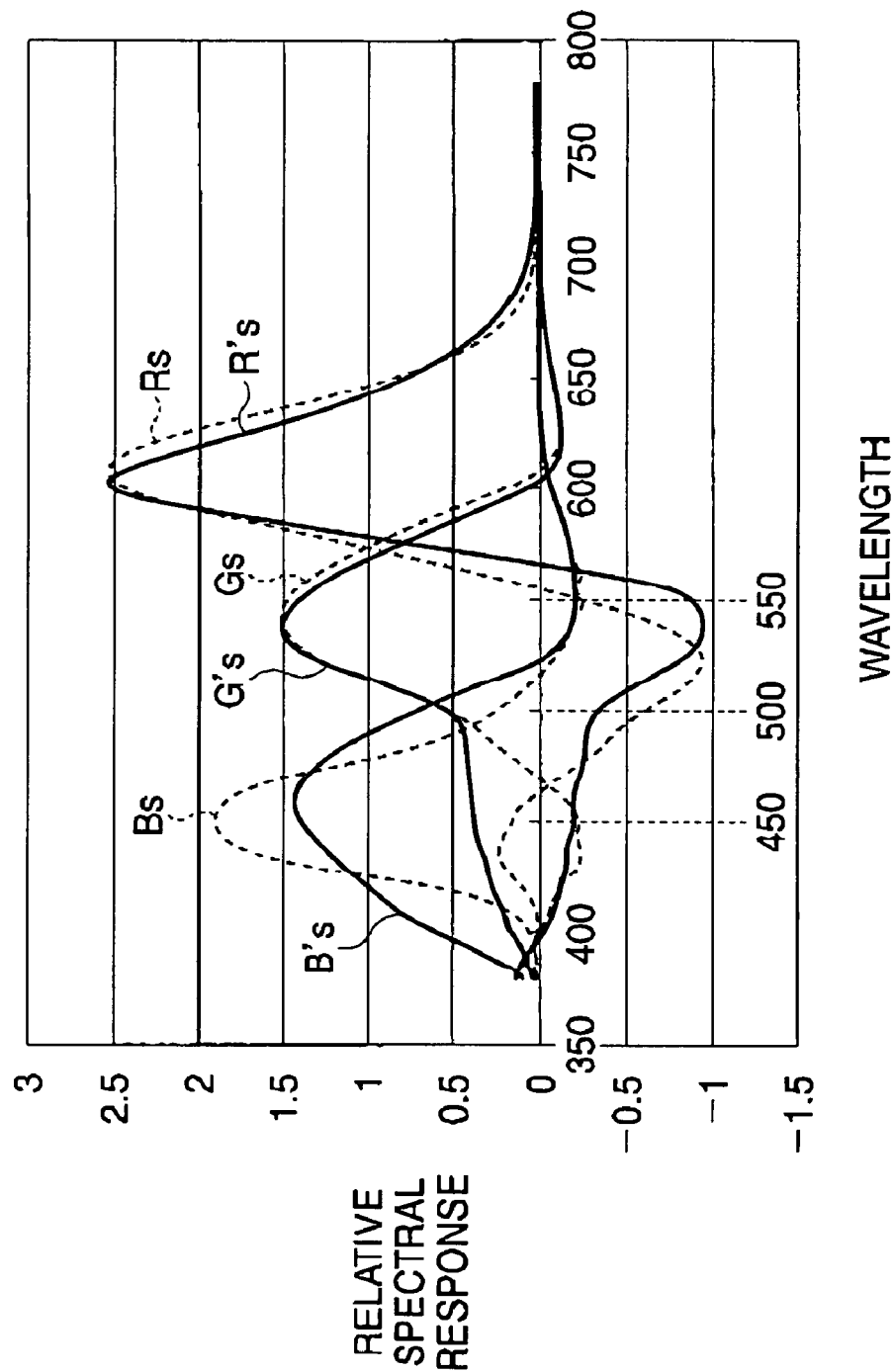
FIG. 11 is a view showing the spectral response distribution of the primary color signals obtained by the second matrix circuit.

FIG. 10 is a view showing the spectral response distribution of the primary color signals obtained by the first matrix circuit 21A. FIG. 11 is a view showing the spectral response distribution of the primary color signals obtained by the second matrix circuit 21B.

As shown in FIG. 10, when the object has a spectral response factor such that the spectral values in the short-wavelength range are relatively large, the objective color is adequately reproduced. Also, when the object has a spectral response factor such that the spectral values in long-wavelength range are relatively large, the objective color is adequately reproduced, as shown in FIG. 11.

When detecting characteristics of an objective-color on the basis of the color signals corresponding to the colors Red and Blue, the ratio of the Rod signals and Blue signals may be utilized instead of the comparison of the Red signals and Blue signals shown in the process in FIGS. 7 and 9. Concretely speaking, in Step S101 in FIG. 7, it may be determined whether the ratio of Blue signals and Red signals "$B_{out}/R_{out}$" is more than a given ratio (for example, 1.1). Also, in Step S103 in FIG. 7, it may be determined whether the ratio "$R_{out}/R_{out}$" is less than a given ratio (for example, 0.59). Similarly, in Step S201 in FIG. 9, the ratio "$B'_{in}/R'_{in}$" may be used.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2005-097429 (filed on Mar. 30, 2005), which is expressly incorporated herein, by reference, in its entirety.

The invention claimed is:

1. An imaging device comprising:
an image sensor;
a color filter that is located on said image sensor and has at least one block of four color elements, each block comprising a red element, a blue element and two green elements having different spectral transmission distribution properties, said spectral transmission distribution properties characterizing spectral response distribution properties of said imaging device, that correspond to three spectral response distribution curves based on a color space;

a signal reading processor that reads two predetermined series of color signals corresponding to the red and blue elements, and two remaining series of color signals corresponding to the green elements, from said image sensor; and a signal processor that generates primary color signals on the basis of the predetermined series of color signals in which information associated with a spectral distribution of an object is included, and selects one of the two remaining series of color signals as an adopted series of color signals based on the predetermined series of color signals;

wherein the predetermined series of color signals correspond to related spectral response distribution curves over the entire spectrum, and each remaining series of color signals correspond to a related spectral response distribution curve over a part of the entire spectrum, wherein said signal processor defines a series of color signals that correspond to the related spectral response distribution curve for a wavelength range in which spectral values in the spectral distribution of the object are relatively large, as the adopted series of color signals.

2. The imaging device of claim 1, wherein said signal processor comprises:
a color conversion processor that performs a matrix computation for the two predetermined series of color signals and the two remaining series of color signals to adjust a color; and
a primary color signal generator that defines the adopted series of color signals on the basis of the matrix-computed series of color signals.

3. The imaging device of claim 1, wherein said signal processor comprises:
a signal determiner that defines the adopted series of color signals on the basis of the predetermined series of color signals; and
a color conversion processor that performs a matrix computation for the predetermined series of color signals and the adopted series of color signals to adjust a color.

4. The imaging device of claim 1, wherein the spectral response distribution properties of the imaging device are determined such that a peak wavelength of a spectral response distribution curve and an adjacent peak wavelength of an adjacent spectral response distribution curve are generally spaced at even intervals.

5. The imaging device of claim 1, wherein one of the remaining series of color signals correspond to the related spectral response distribution curve in a wavelength range less than a peak wavelength of the related spectral response distribution curve, and the other remaining series of color signals corresponds to a spectral response distribution curve in a wavelength range greater than the peak wavelength.

6. The imaging device of claim 1, wherein one of the remaining series of color signals correspond to the related spectral response distribution curve in a wavelength range less than a peak wavelength of the related spectral response distribution curve, and the other remaining series of color signals correspond to the related spectral response distribution curve in a wavelength range greater than the peak wavelength.

7. The imaging device of claim 1, wherein said signal processor generates an average series of color signals that has an average value of the remaining series of color signals, to define the adopted series of color signals.

8. A method for imaging an object comprising:
reading at least four series of color signals corresponding to four color elements from an image sensor, a color filter being located on the image sensor and having at least one block of the four color elements, each block comprising a red element, a blue element and two green elements having different spectral transmission distribution properties, the spectral transmission distribution properties characterizing spectral response distribution properties of the imaging device, that correspond to three spectral response distribution curves based on a color space;

generating primary color signals on the basis of two predetermined series of color signals corresponding to the red and blue elements, in which information associated with a spectral distribution of an object is included, and selecting one of two remaining series of color signals corresponding to the green elements as an adopted series of color signals based on the predetermined series of color signals, the predetermined series of color signals corresponding to a related spectral response distribution curves over the entire spectrum, and each remaining series of color signals corresponds to a related spectral response distribution curve over a part of the entire spectrum; and defining a series of color signals that corresponds to the related spectral response distribution curve for a wavelength range in which spectral values in the spectral distribution of the object are relatively large, as the adopted series of color signals.

9. The method for imaging an object according to claim 8, wherein one of the remaining series of color signals correspond to the related spectral response distribution curve in a wavelength range less than a peak wavelength of the related spectral response distribution curve, and the other remaining series of color signals correspond to the related spectral response distribution curve in a wavelength range greater than the peak wavelength.

10. An apparatus for imaging an object comprising:
an image sensor;
a color filter that is located on said image sensor and has at least one block of four color elements, each block comprising a red element, a blue element, and two green elements having different spectral transmission distribution properties, said spectral transmission distribution properties characterizing spectral response distribution properties of an imaging system, that correspond to three spectral response distribution curves based on a color space;
a signal reading processor that reads two predetermined series of color signals corresponding to the red and blue elements, and two remaining series of color signals corresponding to the green elements, from said image sensor;
a matrix operation processor that performs a matrix operation for the two predetermined series of color signals and the two remaining series of color signals; and
a primary color signal generator that generates primary color signals on the basis of the two predetermined series of color signals in which information associated with a spectral distribution of an object is included, and selects one of the two remaining series of color signals as an adopted series of color signals based on the two predetermined series of color signals;
wherein two spectral response distribution curves corresponding to the two predetermined series of color signals have generally a linear relationship with the corresponding spectral response distribution curves that are based on the color space, over the entire spectrum, and the remaining two spectral response distribution curves corresponding to the remaining two series of color signals have respectively a linear relationship with the remaining one corresponding spectral response distribution curve that is based on the color space, over different parts of the entire spectrum, wherein said primary color signal generator defines a series of color signals that is generally the same as the corresponding remaining spectral response distribution curve for a wavelength range in which spectral values in the spectral distribution of the object are relatively large.

11. The apparatus for imaging an object according to claim 10, wherein one of the remaining series of color signals correspond to the related spectral response distribution curve in a wavelength range less than a peak wavelength of the related spectral response distribution curve, and the other remaining series of color signals correspond to the related spectral response distribution curve in a wavelength range greater than the peak wavelength.

12. An apparatus for imaging an object comprising:
an image sensor;
a color filter that is located on said image sensor and has at least one block of four color elements, each block comprising a red element, a blue element and two green elements having different spectral transmission distribution properties, said spectral transmission distribution properties characterizing spectral response distribution properties of an imaging system, that correspond to three spectral response distribution curves based on a color space;
a signal reading processor that reads two predetermined series of color signals corresponding to the red and blue elements, and two remaining series of color signals corresponding to the green elements, from said image sensor;
an signal selector that selects one of the two remaining series of color signals as an adopted series of color signals based on the predetermined series of color signals, information associated with a spectral distribution of an object being included in the two predetermined series of color signals; and
a matrix operation processor that performs a matrix operation for the two predetermined series of color signals and the adopted series of color signals to generate primary color signals, wherein two spectral response distribution curves corresponding to the two predetermined series of color signals have generally a linear relationship with a corresponding spectral response distribution curve that is based on a color space, over the entire spectrum, and the remaining two spectral response distribution curves corresponding to the remaining two series of color signals have respectively a linear relationship with the remaining one corresponding spectral response distribution curve that is based on the color space, over a part of the entire spectrum, wherein said signal selector selects a series of color signals that is generally the same as the corresponding remaining spectral response distribution curve for a wavelength range in which spectral values in the spectral distribution of the object are relatively large.

13. The apparatus for imaging an object according to claim 12, wherein one of the remaining series of color signals correspond to the related spectral response distribution curve in a wavelength range less than a peak wavelength of the related spectral response distribution curve, and the other remaining series of color signals correspond to the related spectral response distribution curve in a wavelength range greater than the peak wavelength.

* * * * *